United States Patent [19]

Stude

[11] Patent Number: 4,720,933
[45] Date of Patent: Jan. 26, 1988

[54] DIVING SPEAR AND SLING FASTENING APPARATUS THEREFOR

[76] Inventor: Rodney C. Stude, 8163 E. Mineral Dr., Englewood, Colo. 80110

[21] Appl. No.: 885,288

[22] Filed: Jul. 14, 1986

[51] Int. Cl.⁴ .............................................. A01K 81/04
[52] U.S. Cl. ................................................ 43/6; 43/5; 29/460
[58] Field of Search ................. 43/5, 6; 124/17, 20 R; 403/209, 267; 24/265 EE; 29/450, 453, 460

[56] References Cited

U.S. PATENT DOCUMENTS

| | | | |
|---|---|---|---|
| 2,543,551 | 2/1951 | Krug | 403/209 |
| 2,610,376 | 9/1952 | Murana | 403/209 |
| 3,494,346 | 2/1970 | Yount | 124/20 R |
| 3,507,949 | 4/1970 | Campbell | 403/267 |
| 4,027,418 | 6/1977 | Baldi | 43/6 |
| 4,209,929 | 7/1980 | Mishima | 43/6 |
| 4,429,480 | 2/1984 | Stude | 43/6 |

*Primary Examiner*—Kurt Rowan
*Attorney, Agent, or Firm*—Bruce G. Klaas; William P. O'Meara

[57] ABSTRACT

A sling attachment assembly for a diving spear of the type having an elongate shaft with a front end and a rear end and a sling for thrusting said shaft attached to said rear end of said shaft and being constructed of resilient tubing having an elongate central cavity and a first end and a second end, comprising threaded bore means in a terminal end portion of said rear end of said elongate shaft; a wire member having a first leg portion, a second leg portion, and a bend portion connecting said leg portions, each said leg portion engaging a surface portion of said threaded bore means, said bend portion being positioned rearwardly of said threaded bore portion; sealing matrix means positioned in said threaded bore means in sealing engagement with said leg portions of said wire member positioned in said threaded bore means, whereby said wire member is fixedly held in said threaded bore means and whereby said sealing matrix means, said wire member leg portions and bend portion, and said terminal end of said shaft means define and attachment loop; said first end and said second end of said resilient tubing being inserted through said attachment loop; and resilient tubing stop means operably associated with said first end and said second end thereof for preventing said first end and said second end from being removed from said attachment loop.

11 Claims, 5 Drawing Figures

U.S. Patent    Jan. 26, 1988    4,720,933
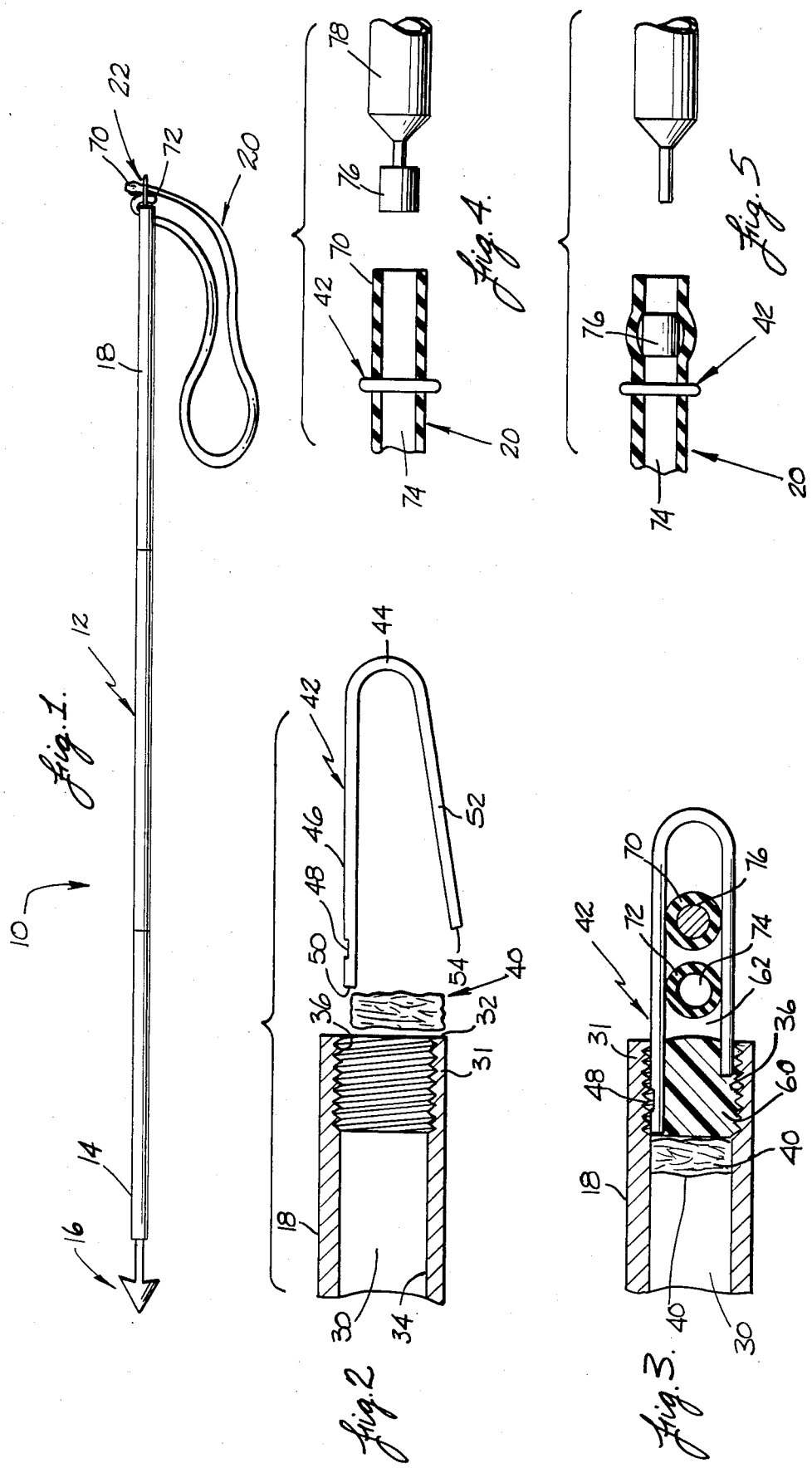

DIVING SPEAR AND SLING FASTENING APPARATUS THEREFOR

BACKGROUND OF THE INVENTION

The present invention relates generally to diving spears and, more particularly, to a method and apparatus for fastening a thrusting sling to a diving spear shaft.

Hand-launched diving spears comprising an elongate shaft, a spear tip mounted at the forward end of the shaft, and a sling device mounted at the rear end of the shaft, have been in use for many years and are sometimes referred to as "Hawaiian sling spears". The sling device which is used to provide the thrust for launching such a spear generally comprises a single loop of rubber surgical tubing which may have an overall length of two to three feet. Such a spear is prepared for launching by placing the surgical tubing loop between the thumb and forefinger of one hand and then stretching the tubing out along the length of the spear. After the tubing has been stretched to near the tip portion of the spear, the diver grasps the spear with the same hand over which the tubing has been looped, thereby holding the tubing in a stretched, taught state. When the diver releases his grip from the spear, the tubing contracts, slinging the spear forwardly through the diver's open hand. A sling spear of this type having an extended range provided by a removable sling mounting assembly is the subject of U.S. Pat. No. 4,429,480 which is hereby specifically incorporated by reference for all that is disclosed therein. This patent describes the mounting of a loop of rubber surgical tubing in a closed wire loop which is in turn mounted in a nylon sleeve. This sleeve is slidably mounted in a rear bore of a diving spear shaft. The tubular member is affixed within the wire loop with copper plugs inserted in a central cavity portion of the surgical tubing. In other well-known versions of the sling spear, the surgical tubing loop is fixedly mounted rather than removably mounted to the rear end of the spear. The nature of the surgical tubing is such that many such fixed attachment means have proven to be ineffective. For example, if the surgical tubing is pierced, as with a screw or staple, the tubing tends to rip apart after a few uses. Excessive compressive force exerted on the tubular member such as provided by an encompassing U-shaped staple, or the like, has also resulted in tearing and rupture of the surgical tubing. Thus, a special problem exists in fixedly mounting of a surgical tubing loop at the end of a diving spear shaft. Conventional mounting techniques generally employ relatively expensive clapping arrangements designed to engage the surface of the surgical tubing without exerting excessive force in a small area and without piercing or rupturing the tubing. Such attachment devices, although effective, significantly increase the cost of production of sling-type diving spears. Thus a need exists for an inexpensive and effective method for attaching a rubber tubing sling to a diving spear shaft.

SUMMARY OF THE INVENTION

The present invention is directed to a fastening assembly for attaching a thrusting sling to the rear end of a diving spear, which is extremely inexpensive and efficient and which overcomes the problems associated with inexpensive prior art sling attachment devices. Thus, it is an object of the present invention to provide a diving spear comprising: (a) an elongate shaft having a front end and a rear end; (b) sling means for thrusting said shaft attached to said rear end of said shaft and comprising resilient tubing means having an elongate central cavity and a first end and a second end; (c) sling attachment means for fixedly attaching said sling means to said rear end of said shaft means comprising: (i) threaded bore means in a terminal end portion of said rear end of said elongate shaft; (ii) a wire member having a first leg portion, a second leg portion, and a bend portion connecting said leg portions, each said leg portion engaging a surface portion of said threaded bore means, said bend portion being positioned rearwardly of said threaded bore portion; (iii) sealing matrix means positioned in said threaded bore means in sealing engagement with said leg portions of said wire member positioned in said threaded bore means, whereby said wire member is fixedly held in said threaded bore means and whereby said sealing matrix means, said wire member leg portions and bend portion, and said terminal end of said shaft means define and attachment loop; (iv) said first end and said second end of said resilient tubing means being inserted through said attachment loop; (v) resilient tubing stop means operably associated with said first end and said second end thereof for preventing said first end and said second end from being removed from said attachment loop.

It is another object of the present invention to provide a sling attachment assembly for a diving spear of the type having an elongate shaft with a front end and a rear end and a sling for thrusting said shaft attached to said rear end of said shaft and being constructed of resilient tubing having an elongate central cavity and a first end and a second end, comprising: (a) threaded bore means in a terminal end portion of said rear end of said elongate shaft; (b) a wire member having a first leg portion, a second leg portion, and a bend portion connecting said leg portions, each said leg portion engaging a surface portion of said threaded bore means, said bend portion being positioned rearwardly of said threaded bore portion; (c) sealing matrix means positioned in said threaded bore means in sealing engagement with said leg portions of said wire member positioned in said threaded bore means, whereby said wire member is fixedly held in said threaded bore means and whereby said sealing matrix means, said wire member leg portions and bend portion, and said terminal end of said shaft means define and attachment loop; (d) said first end and said second end of said resilient tubing being inserted through said attachment loop; (e) resilient tubing stop means operably associated with said first end and said second end thereof for preventing said first end and said second end from being removed from said attachment loop.

It is another object of the present invention to provide a method of fixedly mounting a resilient tubular member having a first end and a second end to an end of a diving spear shaft to provide a looped thrusting sling therefor comprising the steps of: (a) providing a threaded bore at a terminal rear end of the shaft; (b) providing a bent wire member having a first leg and a second leg connected by a bend portion and positioned in separated relationship at a maximum separation distance as measured externally thereof which is slightly greater than the diameter of said threaded bore, said first leg of said wire member being provided with a recessed portion thereon adapted to threadingly engage said threaded bore; (c) applying compressive force to said legs of said wire member and inserting said legs into said threaded bore; (d) removing said compressive force from said legs so as to enable said legs to elastically separate and engage the threaded surface of said threaded bore; (e) filling a portion of said threaded bore in which said wire member is positioned with a sealing matrix so as to provide a closed loop defined by portions of said sealing matrix, said terminal end of said shaft and said first and second leg portions and said bend portion of said wire member; (f) threading said first end and said second end of said resilient tubular member through said loop; (g) attaching stop means to said first and second ends of said resilient member so as to prevent unthreading of said ends of said resilient member from said loop.

BRIEF DESCRIPTION OF THE DRAWING

FIG. 1 is a side elevation view of a diving spear.

FIG. 2 is an exploded partially cross-sectional side elevation view of a sling attachment assembly for a diving spear.

FIG. 3 is a side elevation view of the sling attachment assembly of FIG. 2 in an assembled state.

FIG. 4 is a detailed cross-sectional view of surgical tubing and a tubing insert mounted on an insertion tool.

FIG. 5 is a detailed cross-sectional view of the surgical tubing of FIG. 4 with an implanted insert and insert tool.

DETAILED DESCRIPTION OF THE INVENTION

As illustrated in FIG. 1, a diving spear 10 according to the present invention may comprise an elongate shaft 12 having a front end 14 adapted for mounting a spear tip 16 thereon and a rear end 18 adapted for fixedly mounting a thrusting sling 20 thereon through use of an effective and relatively inexpensive fixed sling fastening assembly 22.

The fixed sling fastening assembly 22 is illustrated in detail in FIGS. 2 and 3. As illustrated by FIG. 2, the elongate shaft 12 rear end portion 18 is tubular, providing a generally cylindrical cavity 30 having a circular opening 32 at the terminal end of the shaft. The cylindrical sidewall 34 which defines the cavity 30 comprises a threaded portion 36 extending forwardly from the shaft terminal end 31. The axial length of the threaded portion may be e.g. ½ inch. In one embodiment of the invention, a shaft cavity plug 40 which may be provided as by paper wadding or the like is inserted into the shaft cavity 30 and moved to a position near the axial forward end of the threaded portion 36.

As also illustrated by FIG. 2, a wire member 42 which may comprise a 3/32 inch stainless steel wire member is adapted to be mounted in the cavity 30. The wire member comprises a bend portion 44 of a few degrees less than 180° which may comprise a bend radius of about 0.1 inches. The bend portion 44 integrally connects a first leg portion 46 which may be e.g. 1.6 inches in length, terminating at an end portion 50. The first leg portion may have a crimp portion therein having a depth of e.g. 0.01 inch and positioned approximately 0.1 inch from the terminal end portion 50. A second leg portion 52 having a terminal end 54 may have a length of e.g. 1.2 inches. The two leg portions 46, 52 are preferably spaced-apart a sufficient distance so as to place the wire member under compression to provide an interference fit within the cavity 30. Thus the outer dimension of the transverse spacing between the two legs is preferably slightly greater, e.g. 0.1 inch greater than the internal diameter of the cylindrical cavity 30. After the shaft cavity plug 40 is inserted into the cavity, the wire member 42 is inserted therein by applying a transverse compressive force to the two legs 46, 52 sufficient to move the legs into sufficiently close relationship to allow insertion of the legs into the cavity 30. The crimp portion 48 of the first leg is adapted to engage the threaded sidewall 36 of the cavity 30 to prevent axial movement of the wire member with respect to the cavity in response to an axial force applied to the member. This threading-type engagement of the crimp portion with the cavity threaded portion also enables the wire member to be precisely positioned therein by rotating the wire about the longitudinal axis of the cavity in a screwing motion.

The wire member is preferably positioned such that it extends approximately 0.8 inches rearwardly of the terminal end 31 of the shaft so as to provide a loop portion having an internal width of approximately 0.2 inches and an axial length of approximately 0.7 inches. The portion of the cavity 30 positioned rearwardly of the plug 40, i.e. the portion thereof containing the wire member 42, is filled with a sealing matrix 60 which is preferably a flexible polyester resin, but which alternately might comprise a hard-drying epoxy resin. Thus, the exposed surface of the sealing matrix 60, the exposed portion of the wire 42, and peripheral portions of the terminal end 31 of the shaft define a closed loop 62 enclosure.

A first end 70 and a second end 72 of the resilient tubing which comprises the thrusting sling 20 are threaded through loop 62. The tubing may comprise a diameter on the order of ⅜ inches with a central cylindrical cavity 74 on the order of 0.1 inch. As illustrated by FIGS. 4 and 5, a stop means for preventing the ends 70, 72 from being dislodged from the loop 62 preferably comprises a cylindrical plug which may be a 5/16 inch diameter cylindrical copper plug. The plug 76 may comprise a hole in the center thereof adapted for receiving an elongate end portion of a ball point pen 78 or other tool to facilitate insertion of the plug 76 into the cavity 74 of the surgical tubing as illustrated in FIGS. 4 and 5. The copper plug 76, once positioned as illustrated in FIG. 5, is sufficiently resistant to axial movement to prevent the surgical tubing from being dislodged from the closed loop 62 by axial force applied thereto. In actual use, after a spear has been purchased, a diver may wish to shorten the surgical tubing to increase the amount of thrust which may be applied by the sling 20. In order to change the length of the tubing, the diver simply cuts the tubing with a pair of scissors at a position between the wire member 42 and the plug 76. He thereafter further cuts the removed portion of the tubing containing the plug, if necessary, to remove the plug. Thereafter, the newly-cut end of the tubing is pulled through the loop 62 until the thrusting sling 20 has been reduced in size a desired amount. Thereafter, the excess portion of the tubing is trimmed off so as to leave approximately ½ inch extending beyond the wire 42. Thereafter the plug 76 is reinserted in the tubing in the manner described above with reference to FIGS. 4 and 5.

From the above it may be seen that the fastening assembly of the present invention provides an adjustable and inexpensive method and apparatus for attaching a thrusting sling 20 to a diving spear shaft. The surgical tubing of the thrusting sling 20 is not pierced or exposed to continuous strain by either the wire member 42 or the plug portions 76 except during periods of actual use of the spear. Thus, this fastening assembly is also very effective and durable.

It is contemplated that the inventive concepts herein described may be variously otherwise embodied and it is intended that the appended claims be construed to include alternative embodiments of the invention except insofar as limited by the prior art.

What is claimed is:

1. A diving spear comprising:
   (a) an elongate shaft having a front end and a rear end;
   (b) sling means for thrusting said shaft attached to said rear end of said shaft and comprising resilient tubing means having an elongate central cavity and a first end and a second end;
   (c) sling attachment means for fixedly attaching said sling means to said rear end of said shaft means comprising:
      (i) threaded bore means in a terminal end portion of said rear end of said elongate shaft;
      (ii) a wire member having a first leg portion, a second leg portion, and a bend portion connecting said leg portions, each said leg portion engaging a surface portion of said threaded bore means, said bend portion being positioned rearwardly of said threaded bore portion;
      (iii) sealing matrix means positioned in said threaded bore means in sealing engagement with said leg portions of said wire member positioned in said threaded bore means, whereby said wire member is fixedly held in said threaded bore means and whereby said sealing matrix means, said wire member leg portions and bend portion, and said terminal end of said shaft means define an attachment loop;
      (iv) said first end and said second end of said resilient tubing means being inserted through said attachment loop;
      (v) resilient tubing stop means operably associated with said first end and said second end thereof for preventing said first end and said second end from being removed from said attachment loop.

2. The invention of claim 1 wherein said wire member first leg portion comprises a recessed area therein adapted to engage said threaded bore portion of said shaft for resisting longitudinal movement of said wire member within said threaded bore.

3. The invention of claim 2 wherein said wire member comprises a 3/32 inch stainless steel wire member having a first leg length of approximately 1.6 inches, a second, leg length of approximately 1.2 inches, a bend portion having a radius of approximately 0.1 inches and a crimp portion having a recess depth of approximately 0.01 inches.

4. The invention of claim 1 wherein said sealing matrix means comprises flexible polyester resin.

5. The invention of claim 1 wherein said resilient tubing stop means comprise plugs inserted in said tubular cavity of said resilient tubing first end and second end for expanding the diameter of said first and second ends sufficiently to prevent sliding removal thereof from said attachment loop.

6. A sling attachment assembly for a diving spear of the type having an elongate shaft with a front end and a rear end and a sling for thrusting said shaft attached to said rear end of said shaft and being constructed of resilient tubing having an elongate central cavity and a first end and a second end, comprising:
   (a) threaded bore means in a terminal end portion of said rear end of said elongate shaft;
   (b) a wire member having a first leg portion, a second leg portion, and a bend portion connecting said leg portions, each said leg portion engaging a surface portion of said threaded bore means, said bend portion being positioned rearwardly of said threaded bore portion;
   (c) sealing matrix means positioned in said threaded bore means in sealing engagement with said leg portions of said wire member positioned in said threaded bore means, whereby said wire member is fixedly held in said threaded bore means and whereby said sealing matrix means, said wire member leg portions and bend portion, and said terminal end of said shaft means define an attachment loop;
   (d) said first end and said second end of said resilient tubing being inserted through said attachment loop;
   (e) resilient tubing stop means operably associated with said first end and said second end thereof for preventing said first end and said second end from being removed from said attachment loop.

7. The invention of claim 6 wherein said wire member first leg portion comprises a recessed area therein adapted to engage said threaded bore portion of said shaft for resisting longitudinal movement of said wire member within said threaded bore.

8. The invention of claim 7 wherein said wire member comprises a 3/32 inch stainless steel wire member having a first leg length of approximately 1.6 inches, a second, leg length of approximately 1.2 inches, a bend portion having a radius of approximately 0.1 inches and a crimp portion having a recess depth of approximately 0.01 inches.

9. The invention of claim 6 wherein said sealing matrix means comprises flexible polyester resin.

10. The invention of claim 6 wherein said resilient tubing stop means comprise plugs inserted in said tubular cavity of said resilient tubing first end and second end for expanding the diameter of said first and second ends sufficiently to prevent sliding removal thereof from said attachment loop.

11. A method of fixedly mounting a resilient tubular member having a first end and a second end to an end of a diving spear shaft to provide a looped thrusting sling therefor comprising the steps of:
   (a) providing a threaded bore at a terminal rear end of the shaft;
   (b) providing a bent wire member having a first leg and a second leg connected by a bend portion and positioned in separated relationship at a maximum separation distance a measured externally thereof which is slightly greater than the diameter of said threaded bore, said first leg of said wire member being provided with a recessed portion thereon adapted to threadingly engage said threaded bore;
   (c) applying compressive force to said legs of said wire member and inserting said legs into said threaded bore;
   (d) removing said compressive force from said legs so as to enable said legs to elastically separate and engage the threaded surface of said threaded bore;
   (e) filling a portion of said threaded bore in which said wire member is positioned with a sealing matrix so as to provide a closed loop defined by portions of said sealing matrix, said terminal end of said shaft and said first and second leg portions and said bend portion of said wire member;

(f) threading said first end and said second end of said resilient tubular member through said loop;

(g) attaching stop means to said first and second ends of said resilient member so as to prevent unthreading of said ends of said resilient member from said loop.

* * * * *